United States Patent [19]

DeLong

[11] 4,306,333
[45] Dec. 22, 1981

[54] GIZZARD INSPECTION AND PEELING SYSTEM

[76] Inventor: Horace J. DeLong, Rte. 6 - Box 257 A, Garrison Rd., Macon, Ga. 31201

[21] Appl. No.: 124,562

[22] Filed: Feb. 25, 1980

[51] Int. Cl.³ ............................................. A22C 21/00
[52] U.S. Cl. ........................................ 17/11; 17/50
[58] Field of Search ........................ 17/11, 50, 45, 1 R

[56] References Cited

U.S. PATENT DOCUMENTS

| | | |
|---|---|---|
| 23,758 | 7/1953 | Darrow et al. . |
| 2,861,293 | 6/1958 | Platt . |
| 2,908,935 | 7/1959 | Shrader . |
| 3,099,038 | 7/1963 | Platt . |
| 3,119,144 | 4/1964 | Hill . |
| 3,159,872 | 8/1964 | Hill . |
| 3,406,425 | 8/1968 | Hill . |
| 3,411,828 | 7/1968 | Hill . |
| 3,480,991 | 7/1969 | Edwards, Sr. . |
| 3,559,233 | 2/1971 | Bottomley et al. ...................... 17/45 |
| 3,579,714 | 10/1971 | Edwards, Sr. . |
| 3,930,283 | 9/1976 | Martin . |
| 3,940,830 | 3/1976 | Anderson ........................... 17/45 X |
| 4,057,875 | 10/1977 | Hill . |
| 4,073,040 | 10/1978 | Hill . |
| 4,203,178 | 8/1980 | Hazenbroek . |

Primary Examiner—Willie G. Abercrombie
Attorney, Agent, or Firm—Jones, Thomas & Askew

[57] ABSTRACT

Poultry gizzards are washed down an inclined inspection table toward a worker standing at a pair of peeler rolls. The worker visually inspects each gizzard and removes those gizzards needing additional peeling to a repeel hopper and removes those gizzards that do not need additional peeling to a discharge hopper. The gizzards moved to the repeel hopper are washed to one end portion of the peeler rolls and are moved along the rotating peeler rolls and peeled. After peeling, the worker removes the gizzards from the peeler rolls and places them in the discharge hopper.

13 Claims, 5 Drawing Figures

GIZZARD INSPECTION AND PEELING SYSTEM

BACKGROUND OF THE INVENTION

This invention relates to a poultry gizzard inspection station for use in a poultry processing plant, wherein the poultry gizzards which have been previously split and peeled are inspected and sorted. Those gizzards needing re-peeling are separated from the other properly peeled gizzards and peeled.

In poultry processing plants where poultry is slaughtered and prepared for market, it is common practice to remove the gizzards and other viscera from the birds, detach the other viscera from the gizzards, cut open or "split" the gizzards and remove or "peel" the inner lining from the gizzards. Various machines have been developed and are in use which perform the splitting and peeling functions. Because poultry gizzards are relatively tough and therefore difficult to split and peel, the equipment used in peeling the gizzards frequently fails to properly remove the linings from the gizzards. The gizzards must be inspected in the processing plant after the machine peeling step, and those gizzards that have not been properly peeled musted be re-peeled. The inspection and re-peeling of the gizzards requires the presence and attention of a worker at each gizzard processing line and is considered by most poultry processers to be an expensive process. The worker is usually required to manually remove the gizzards which require re-peeling from those that have been properly peeled and place the gizzards to be re-peeled against a pair of counter-rotating meshed peeler rolls which catch the lining of the gizzards between their teeth and pull the lining away from the gizzard.

SUMMARY OF THE INVENTION

Briefly described, the present invention comprises a gizzard inspection and peeling system wherein poultry gizzards from several gizzard processing stations are delivered to the upper end of an inclined inspection table. Counter-rotating gizzard peeler rolls are located at the lower end of the inspection table, and the gizzards are washed down the slope of the inclined inspection table toward the worker at the peeler rolls. Those gizzards that have been properly split and peeled are removed from the inspection table by the worker and placed in a discharge hopper where they move to a subsequent work station. Those gizzards that were not properly peeled are removed by the worker to a re-peel hopper where they move toward the entrance end of the peeler rolls. The gizzards are moved along the lengths of the counter-rotating peeler rolls by the helical teeth of the rolls, and the rolls tend to engage the linings of the gizzards and pull the lining from the gizzards. The worker also inspects the gizzards that are being automatically re-peeled, and those gizzards that have been properly peeled in the re-peeling process are removed by the worker to the discharge conduit. Those gizzards that still have not been properly peeled are grasped by the worker and manually applied to the re-peel rollers and, after having been properly peeled, are placed in the discharge hopper.

The gizzards tend to move in sequence through the system, and the water applied to the inclined surfaces of the apparatus tends not only to move the gizzards through the system but tends to continuously wash the apparatus. The apparatus is constructed with a drain at the lower end of the inspection table that prevents the water flowing down the slope of the inspection table from entering the area of the peeler rolls, and with another drain at the lower end of the re-peel hopper that prevents the water flowing down the slope of the re-peel hopper from entering the peeler rolls. This water is discharged as waste water. The water used in the discharge hopper moves on with the properly peeled gizzards to the subsequent work station.

Another feature of the invention is the application of reduced air pressure to the lower surfaces of the peeler rolls at the entrance end of the peeler rolls, whereby the gizzards are initially induced by a flow of air downwardly between and about the peeler rolls to engage the upper surfaces of the peeler rolls, and the tissue to be removed from each gizzard is induced to move between the teeth of the peeler rolls. This feature assures that each gizzard moving through the apparatus will be engaged by the teeth of the counter-rotating peeler rolls. Also, there are missing teeth in the peeler rolls at the entrance end of the peeler rolls. The missing teeth cause the gizzards to turn or tumble on the peeler rolls and also to form additional intermittent air passages between and about the peeler rolls to cause surges of air down about and between the peeler rolls.

Another feature of the invention is the conveyor means for transferring the gizzards from the conventional splitting and peeling apparatus to the inspection table, which includes an inclined conveyor platform for initially receiving the gizzards, a vibrator for vibrating the conveyor platform, a water wash for inducing the gizzards to move across the vibrated platform and for cleaning the platform, and a plurality of parallel transfer rods that extend from the vibrator platform over the upper end portion of the inclined inspection table, whereupon the water applied to the vibrator platform is allowed to drain between the rods and away from the inclined inspection table, while the gizzards are induced to move along the rods until they are dropped onto the surface of the inspection table.

Thus, it is an object of this invention to provide a gizzard inspection and peeling system which can be used in conjunction with several poultry gizzard processing machines and which permits a worker to expediently inspect and sort poultry gizzards from several machines and to re-peel the poultry gizzards that have not already been properly peeled.

Another object of this invention is to provide a gizzard inspection and peeling system which enables a worker to reliably inspect a large number of poultry gizzards, to determine if some of the gizzards require re-peeling, and to enable the worker to rapidly re-peel those gizzards requiring peeling.

Another object of this invention is to provide a poultry gizzard inspection and re-peeling system that includes means for automatically re-peeling those gizzards that require re-peeling and means for permitting the worker to manually apply the gizzards to gizzard peeling rolls.

Other objects, features and advantages of the present invention will become apparent upon reading the following specification, when taken in conjunction with the accompanying drawings.

DETAILED DESCRIPTION

Figure 1:
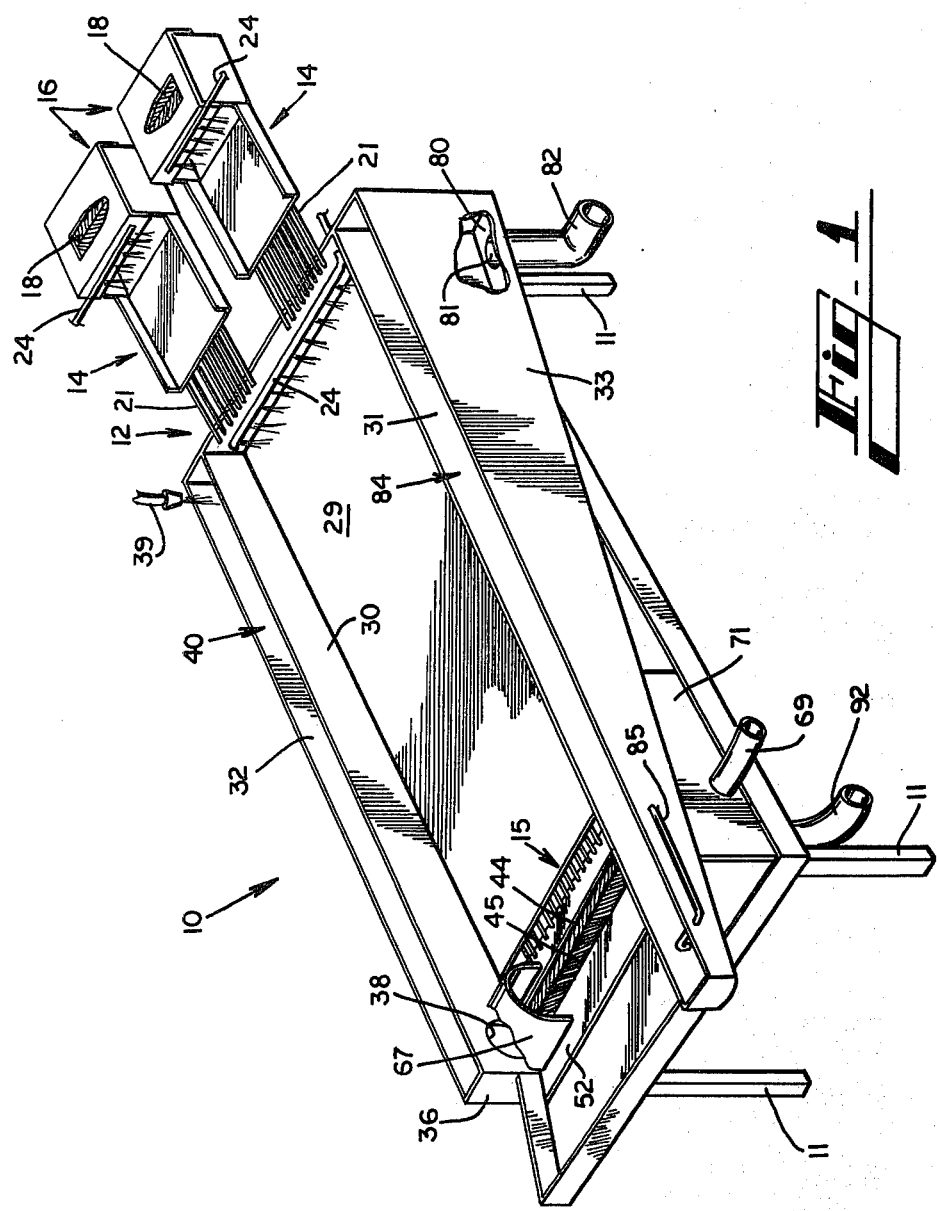
FIG. 1 is a perspective illustration of the gizzard inspection and peeling system.
Figure 2:
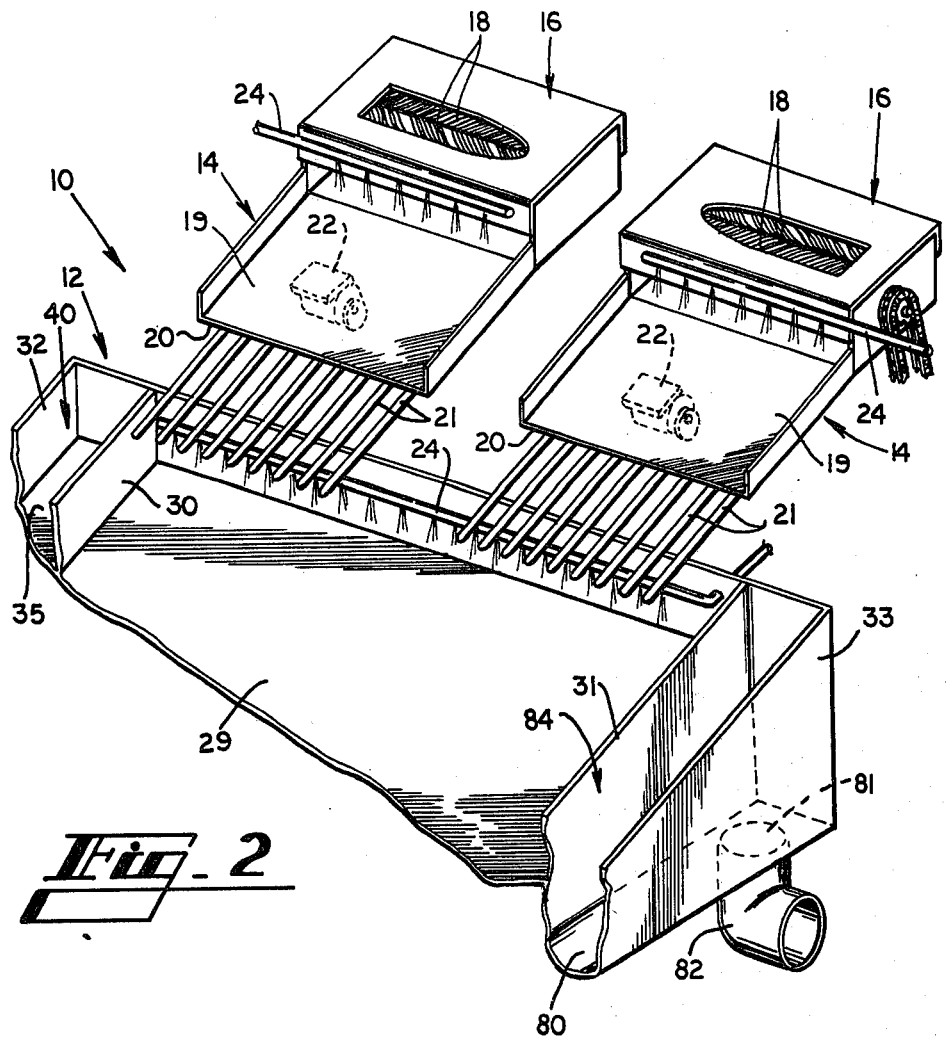
FIG. 2 is a perspective illustration of the vibrator conveyor apparatus used to transfer the gizzards to the inspection table.
Figure 3:
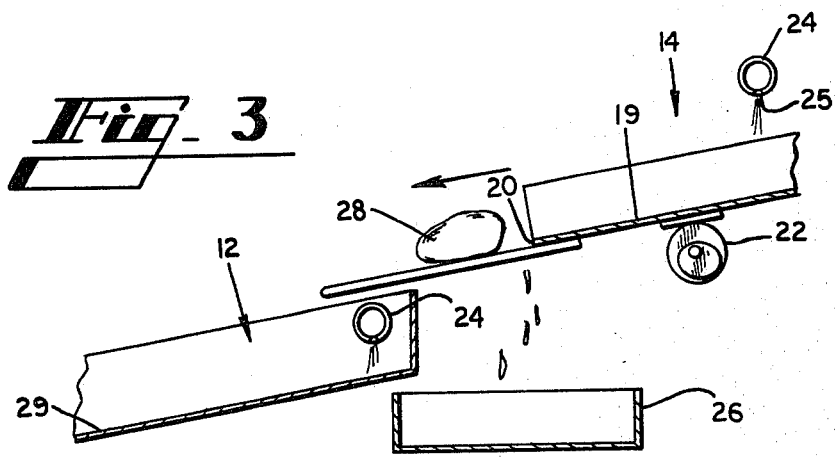
FIG. 3 is a schematic side elevational view of a vibrator conveyor of FIG. 2.

Referring now in more detail to the drawings, in which like numerals indicate like parts through the several views, FIG. 1 illustrates the gizzard inspection and peeling system 10 that includes a supporting framework 11, an inspection table 12 mounted on framework 11, one or more vibrator conveyors 14 at one end of the inspection table 12, and peeler roll assembly 15 positioned at the other end of inspection table 12.

One or more vibrator conveyors 14 are mounted adjacent a gizzard processing apparatus 16 and function to transfer previously processed gizzards from a gizzard processor apparatus 16 to the inspection table 12. The apparatus 16 does not form a part of this invention, but is considered to be conventional prior art gizzard processing equipment of the type that includes peeler rolls 18 that are used to grasp and remove the lining from the poultry gizzards. The vibrator conveyors 14 are mounted adjacent the gizzard processing equipment 16 and comprise an incline conveyor plate 19 that is inclined downwardly from the gizzard processing equipment 16 toward the upper end of inspection table 12. The discharge edge 20 of the conveyor plate 19 does not reach over the inspection table 12, but a plurality of parallel conveyor rods 21 are each attached at one of their ends to the bottom surface of conveyor plate 19 and extend over inspection table 12. A vibrator 22 is mounted to the bottom surface of conveyor plate 19 and functions to continuously vibrate the conveyor plate and the conveyor rods. A water wash conduit 24 is spaced above conveyor plate 19 and has water discharge appertures 25 directed downwardly to the upper end of the conveyor plate to continuously wash the conveyor plate with water. The water flowing over the conveyor plate 19 falls off the discharge edge 20 of the conveyor plate and does not reach the inspection table 12, but is collected in an appropriate drain pan 26 and is discharged as waste.

The gizzards 28 moved from the gizzard processing equipment 16 therefore move under the influence of gravity and by the moving stream of water flowing across conveyor plate 19 down the incline of the conveyor plate, then across the conveyor rods 21 and then fall on inspection table 12.

Inspection table 12 comprises a work surface 29 that is inclined downwardly from vibrator conveyor 14 to peeler roll assembly 15. Internal side walls 30 and 31 are formed on opposite sides of the work surface 29 and external side walls 32 and 33 are formed parallel to an outboard of internal side walls 30 and 31. A bottom wall 35 is formed between internal and external side walls 30 and 32. Bottom wall 35 is sloped at an angle substantially the same as the angle of incline of work surface 29 of inspection table 12. An end wall 36 is formed at the lower end portions of internal and external side walls 30 and 32 and of bottom wall 35, and an opening 38 is formed in internal side wall 30 adjacent end wall 36. Opening 38 is located over one end of the peeler rolls 15. Thus, internal and external side walls 30 and 32 and bottom wall 35 function as a re-peel hopper 40 for directing poultry gizzards in a downward direction toward one end of the peeler rolls 15. The opening 38 is formed at a position above one end portion of the peeler rolls 15. A water wash conduit 39 is located at the upper end of re-peel hopper 40 and supplies a continuous stream of water in a downward direction through the re-peel hopper toward the outlet opening 38 to continuously wash the hopper and to induce the movement of the gizzards down the incline of the hopper toward the peeler rolls 15.

Figure 5:
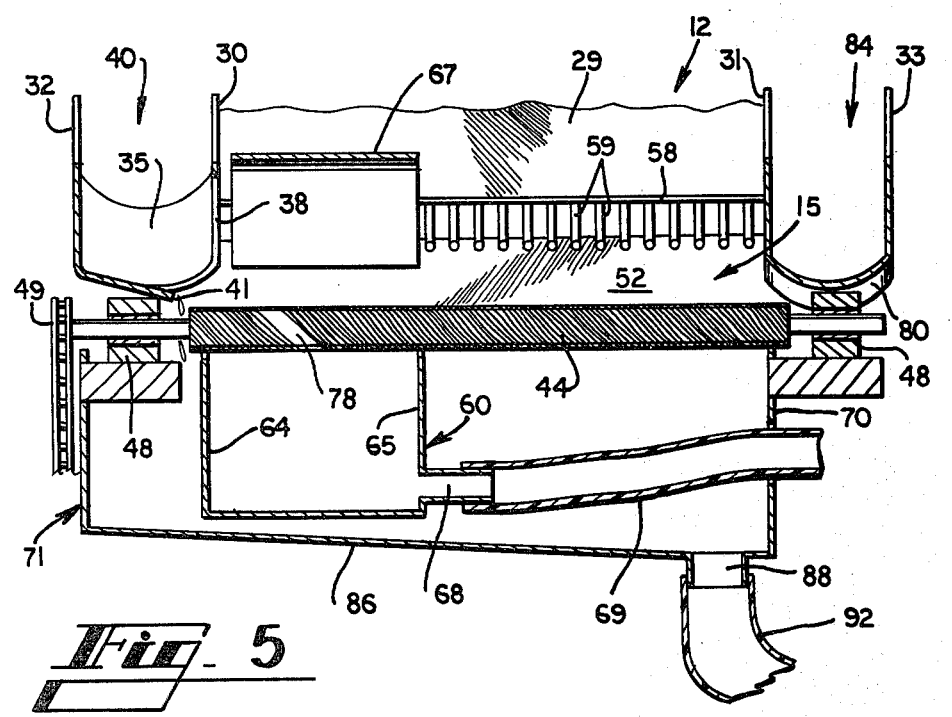
FIG. 5 is a side cross-sectional view of the peeler rolls, vacuum chamber, re-peel hopper and discharge hopper.

As is illustrated in FIG. 5, the opening 38 in internal side wall 30 undercuts into bottom wall 35 so that the edge 41 of the opening does not extend over the ends of the peeler rolls 44 and 45 of peeler roll assembly 15. Thus, the water moving down the incline of the re-peel hopper 40 is not transferred to the peeler rolls but the elevation of the opening 38 and the close spacing of the opening with respect to the peeler rolls is such that the gizzards will be transferred by gravity from the re-peel hopper 40 to the upper surfaces of the peeler rolls of peeler roll assembly 15.

Peeler roll assembly 15 is recessed in the work surface 29 and includes a pair of peeler rolls 44 and 45 that are arranged in parallel juxtaposition and which include a plurality of meshed helical teeth 46. Peeler rolls 44 and 45 are rotatably mounted at their ends in appropriate bearings 48 and one of the peeler rolls is driven by a sprocket and chain 49 from a motor (not shown) and the meshed teeth of the peeler rolls cause the peeler rolls to rotate in the directions as indicated by arrows 50 and 51. Thus, the upper surfaces of the peeler rolls move toward the opposite peeler roll, downwardly between the peeler rolls.

Peeler roll assembly 15 includes a guide plate 52 that includes inwardly and downwardly sloped surfaces 54 and 55, with the guide plate defining a slot opening 56 placed over the intersection of the peeler rolls 44 and 45. Work surface 29 of inspection table 12 does not overlie guide plate 52, but forms with guide plate 52 an elongated slot 58 that functions as a drain opening. A plurality of conveyor rods 59 are each mounted at one of their ends to the bottom surface of work surface 29 and extend over to guide plate 52 thereby forming a conveyor surface for the movement of the gizzards from work surface 29 to peeler roll assembly 15.

Suction chamber 60 is formed by side walls 61 and 62, end walls 64 and 65 and bottom wall 66 beneath one end portion of peeler rolls 44 and 45. The upper portion of suction chamber 60 is closed by guide plate 52. Suction chamber 60 is located at the entrance end portion of the peeler rolls 44 and 45, adjacent the opening 38 of re-peel hopper 40. Finger guard 67 is an inverted U-shaped structure mounted on guide plate 52, over suction chamber 60. Suction chamber 60 includes an outlet opening 68 which is connected to suction conduit 69. Suction conduit 69 extends through the side wall 70 of lower drain pan 71, and communicates with accumulation chamber 72 through its entrance opening 74. Compressor 75 has its inlet in communication with the exhaust 76 of accumulation chamber 72. Thus, compressor 75 functions to draw a reduced air pressure in suction chamber 60.

Figure 4:
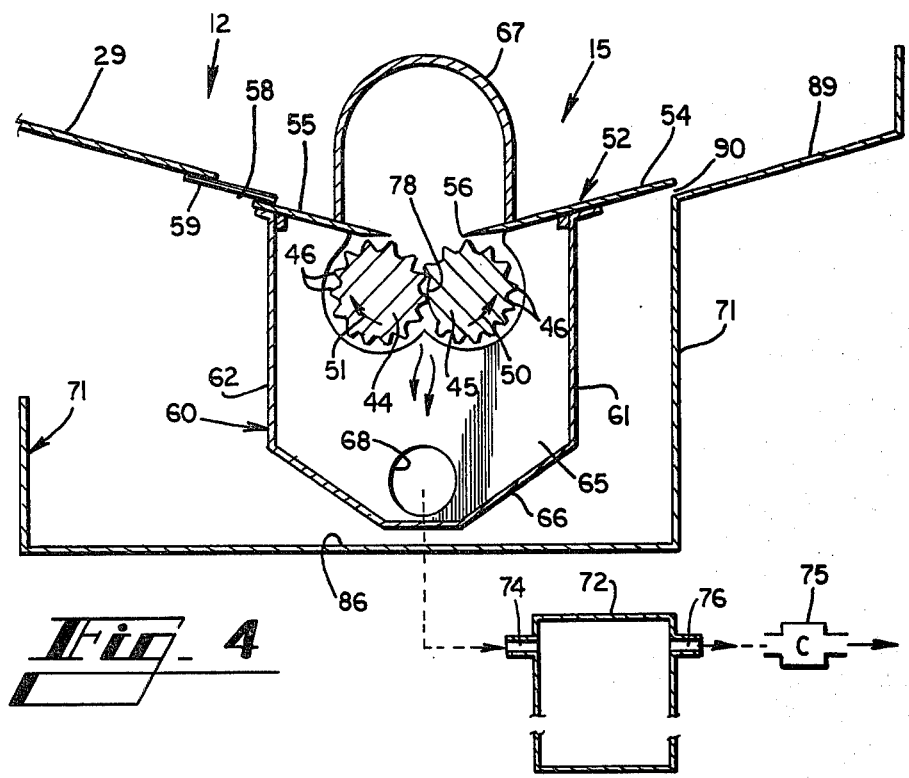
FIG. 4 is an end cross-sectional view of the peeler rolls and the vacuum chamber of the peeler rolls, with the vacuum tank, compressor and accumulation chamber illustrated in schematic form.

As illustrated in FIGS. 4 and 5, the peeler rolls 44 and 45 each include a plurality of oppositely threaded helical teeth 46, with the teeth of one roll fitting into the spaces between teeth of the other roll. The end portions of the peeler rolls 44 and 45 which are over the suction chamber 60 have missing teeth therefrom which form spiral gaps 78 extending about the peeler rolls. The spiral gap of peeler roll 45 is longitudinally offset from the spiral gap of the peeler roll 44. The spiral gaps 78 form intermittent air passages between the adjacent peeler rolls 44, 45 when the gaps face the opposite peeler roll (FIG. 4), so that intermittent surges of air move downwardly between the peeler rolls to induce the gizzards to move into the teeth of the peeler rolls. Also, when the gaps 78 of the peeler rolls pass over the upper surfaces of the peeler rolls, the smooth surface of the gap causes the peeler roll to intermittently loose part of its frictional contact with respect to any gizzard on top of the peeler rolls, while the opposite peeler roll continues to apply its full frictional pull on the gizzard, causing the gizzard to roll over or tumble on the peeler rolls. Additionally, when the gap 78 pass beneath the edges of the elongated slot opening 56, additional air passage space is formed for the movement of air beneath the guide plate 52 and over the top surface of the peeler roll 44 or 45.

The finger guard 67 keeps the fingers of worker away from the portions of peeler rolls 44 and 45 that include the gaps 78 between the teeth of the peeler rolls, assuring that the worker will not inadvertantly have a finger caught in the peeler rolls.

When the gizzards that are to be re-peeled have moved through the re-peel hopper and over the first portion of the peeler rolls 44 and 45, most of the re-peeling function will have been accomplished; however, when a gizzard emerges from the finger guard 67 and has not been properly re-peeled, the worker can manually grasp the gizzard and urge the portion to be peeled directly against the rotating peeler rolls to accomplish the re-peel function.

The internal side wall 31 and external side wall 33 at the side of inspection table 12 also include a bottom wall 80, and botton wall 80 is sloped downwardly in a direction opposite to the direction of slope of the work surface 29 of inspection table 12, downwardly and away from the position of the worker adjacent the peeler roll assembly 15. Discharge opening 81 is formed at the lower end portion of bottom wall 80, and discharge conduit 82 extends from discharge opening 81. Thus, internal and external side walls 31 and 33 and bottom wall 80 form a discharge hopper 84. Water wash conduit 85 supplies a continuous stream of water to discharge conduit 84. When the worker retreives a properly peeled gizzard from the inspection table 12, the worker places the gizzard in discharge conduit 82, and the inclined bottom wall 80 together with the water from the water wash conduit 85 function to move the gizzard down the inclined discharge hopper toward the discharge opening 81, on through conduit 82 and to a subsequent work station.

Lower drain pan 71 is positioned beneath the lower end portion of inspection table 12 and includes a slopped bottom wall 86 with a drain opening 88 at its lower portion. Lower drain pan 71 is located beneath drain opening 58 at the lower end portion of work surface 29 of inspection table 12 and below the discharge opening 38 of re-peel hopper 40, so as to collect the water discharged from these surfaces. Additionally, a sloped pan 89 is positioned adjacent the workers positioned at the lower end portion of work table 12, and slot 90 (FIG. 4) is formed between pan 89 and guide plate 52 of peeler roll assembly 15 to cause any water draining downwardly from the sloped pan 89 to drain into the lower drain pan 71. The water that drains into drain pan 71 is treated as waste water and is drained through a conduit 92.

OPERATION

The poultry gizzards moving away from the gizzard processing equipment 16 usually are directed by gravity to the vibrator conveyors 14. The slope of the conveyor plates 19 together with the vibration imparted to the conveyor plates by the vibrators 22 and the stream of water applied to the conveyor plates 19 by the water wash conduits 24 tend to move the gizzards down the conveyor plates and onto the rods 21. The momentum of the gizzards together with the downward slope and vibrations of the conveyor rods 21 tend to continue to pass the gizzards on to the inspection table 12. In the meantime, the water from the conveyor plates moves off the discharge edge 20 of the conveyor plates and is collected in an appropriate drain pan 26.

The continuous flow of water from the water wash conduit 24 down the work surface 29 and the slope of the inclined work surface 29 cause the gizzards to continue in their movement down toward peeler roll assembly 15. As the gizzards move down the work table 12 they are inspected by the worker standing adjacent the peeler roll assembly. Those properly peeled gizzards are manually removed by the worker and placed in the discharge hopper 84, where the downward slope of the discharge hopper and the water wash from water wash conduit 85 cause the gizzards to move downwardly away from the worker toward and through discharge conduit 82 to a subsequent work station.

Those gizzards that have been improperly peeled by the previous equipment are moved by the worker in the opposite direction and placed in the re-peel hopper 40. The downward slope of the re-peel hopper together with the continuous water wash from the water wash conduit 39 cause the gizzards to move through the opening 38 at the lower end of the re-peel hopper to the top surfaces of the peeler rolls 44 and 45. The suction applied to the bottom surfaces of the peeler rolls induces the gizzards to be moved into the meshing teeth of the peeler rolls, and the peeler rolls tend to properly peel the gizzards. The air and material removed from the gizzards move through the suction chamber 60 beneath the end portion of the peeler rolls, through the suction conduit 69 to the accumulation chamber 72, where the material is collected and the air continues to move from the accumulation chamber on through compressor 75 to the atmosphere.

As the gaps 78 between the teeth of the peeler rolls 44 and 45 move about the peeler rolls, additional surges of air flow downwardly between and about the peeler rolls so as to urge the gizzards into the meshing teeth of the peeler rolls. Additionally, when the gaps 78 of the peeler rolls pass through slot 56 of the guide plate 52, the gaps cause a temporary reduction in the friction applied to the gizzard while the opposite peeler roll does not loose its frictional pull on the gizzard, causing the gizzard to tumble or turn on the peeler rolls. This increases the likelihood that the peeling of the gizzard will be engaged by the meshing teeth of the peeler rolls.

When the gizzards emerge from the finger guard 67, the worker places the properly peeled gizzards in the discharge hopper 84. Those gizzards that are still not properly peeled are grasped by the worker and are manually applied against the rotating peeler rolls until properly peeled, and the operator then places the gizzards in the discharge chamber.

While this invention has been described in detail with particular reference to a preferred embodiment thereof, it will be understood that variations and modifications can be effected within the spirit and scope of the invention as described hereinbefore and as defined in the appended claims.

I claim:

1. Apparatus for processing poultry gizzards and the like comprising a support frame, an inclined inspection table mounted on said support frame with an upper end portion for receiving poultry gizzards and sloped downwardly and laterally to a lower end portion, a pair of rotatable peeler rolls positioned at the lower end portion of said inspection table, a re-peel hopper on one side of said inspection table and terminating at its lower end portion at one end of said rotatable peeler rolls, and a discharge hopper on the other side of said inspection table, whereby a worker stands at the lower end portion of the inspection table and visually inspect poultry gizzards as they move down the incline of the inspection table and moves the poultry gizzards that require re-peeling to the re-peel hopper and moves the poultry gizzards that do not require re-peeling to the discharge hopper, and the poultry gizzards moved to the re-peel hopper move to one end of and then along the peeler rolls.

2. The apparatus of claim 1 and wherein said re-peel hopper comprises an inclined trough sloped downwardly in approximately the same direction of incline as said inspection table.

3. The apparatus of claim 1 and wherein said discharge hopper comprises an inclined trough sloped downwardly in a direction approximately opposite to the direction of incline of said inspection table.

4. The apparatus of claim 1 and further including vacuum means for reducing the pressure of the air below said peeler rolls to induce a flow of air downwardly with respect to the peeler rolls and to induce the tissue of the poultry gizzards to be grasped by the teeth of the peeler rolls.

5. The apparatus of claim 1 and wherein said peeler rolls comprise a pair of juxtaposed elongated rolls with a plurality of helical teeth, with the teeth of one roll extending opposite to the teeth of the other roll and with the teeth of the rolls meshed, and wherein at least one of said rolls defines a spiral gap in its teeth along a portion of the length of the peeler roll, and means for inducing a flow of air downwardly between said peeler rolls at said gap.

6. The apparatus of claim 5 and wherein the spiral gap in the teeth of at least one of said peeler rolls is located at the end of the rolls adjacent said re-peel hopper, and further including a guard over the portion of the rolls which include the gap, said guard being spaced over the rolls a distance sufficient to permit poultry gizzards to move between said guard and said peeler rolls.

7. The apparatus of claim 1 and further including means for supplying water to the upper end portion of said inspection table and to said re-peel hopper to wash the gizzards toward the worker, and first drain means for collecting the water from said inspection table and said re-peel hopper, said means for supplying water including means for supplying water to said discharge hopper, and a discharge conduit connected to said discharge hopper for directing the gizzards and water from the discharge hopper to another work station.

8. The apparatus of claim 1 and further including a conveyor plate positioned adjacent the upper end portion of said inspection table and inclined downwardly toward the inspection table, means for vibrating said conveyor plate, a plurality of parallel rods extending from said conveyor plate at a downward incline toward said inspection table, and means for supplying water to said conveyor plate, whereby gizzards on the conveyor plate move from the conveyor plate along the rods to the inspection table and the water supplied to the conveyor plate falls through the rods.

9. Apparatus for processing poultry gizzards and the like comprising an inclined inspection table for receiving poultry gizzards at its upper end portion and directing the gizzards to move down the incline of the table, a pair of gizzard peeler rolls at the lower end of said inspection table, water supply means at the upper end of said inspection table for directing water to said inspection table, drain means at the lower end of said inspection table for draining water from said inspection table before the water reaches said peeler rolls, a re-peel hopper positioned adjacent said inspection table and defining an outlet opening at one end portion of said peeler rolls, water supply means for directing water to said re-peel hopper, drain means at the outlet opening of said re-peel hopper for draining water from said re-peel hopper before the water reaches the peeler rolls, a discharge hopper adjacent said inspection table and defining an outlet and water supply means for directing water to said discharge hopper outlet, whereby a worker inspects the poultry gizzards as they move down the inspection table and places the properly peeled gizzards in the discharge hopper and places the improperly peeled gizzards in the re-peel hopper.

10. The apparatus of claim 9 and further including means for applying reduced air pressure to the lower surfaces of said peeler rolls to induce a flow of air downwardly with respect to the peeler rolls.

11. The apparatus of claim 10 and wherein said peeler rolls include meshed helical teeth, and at least one of said peeler rolls has some teeth missing to form a gap between the teeth.

12. The apparatus of claim 9 and wherein said re-peel hopper comprises a trough inclined at an angle substantially the same as the angle of incline of said inspection table, and wherein said discharge hopper comprises a trough inclined in a direction substantially opposite to the direction of incline of said inspection table.

13. Apparatus for processing poultry gizzards and the like comprising an inclined inspection table for receiving poultry gizzards at its upper end portion and directing the gizzards to move down the incline of the table, a pair of gizzard peeler rolls at the lower end portion of said inspection table, a re-peel hopper positioned adjacent said inspection table, and defining an outlet opening at one end portion of said peeler rolls, and a discharge hopper adjacent said inspection table, whereby a worker inspects the poultry gizzards as they move down the inspection table and places the properly peeled gizzards in the discharge hopper and places the improperly peeled gizzards in the re-peel hopper.

* * * * *